Figure 1:
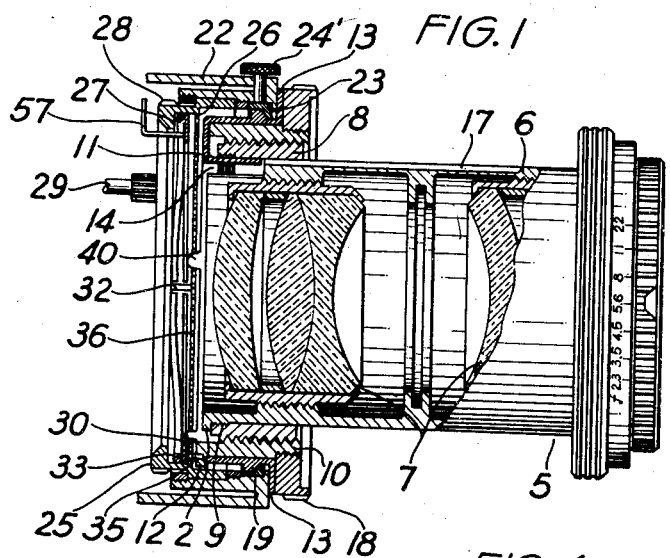

March 12, 1940.　　　　J. MIHALYI　　　　2,193,038
FOCUSING MECHANISM FOR INTERCHANGEABLE LENSES
Filed March 11, 1938

Joseph Mihalyi
INVENTOR
BY
ATTORNEYS

Patented Mar. 12, 1940

2,193,038

UNITED STATES PATENT OFFICE 2,193,038

FOCUSING MECHANISM FOR INTERCHANGEABLE LENSES

Joseph Mihalyi, Rochester, N. Y., assignor to Eastman Kodak Company, Rochester, N. Y., a corporation of New Jersey Application March 11, 1938, Serial No. 195,336

10 Claims. (Cl. 95—44)

The present invention relates to photographic apparatus, and particularly to photographic cameras adapted to employ interchangeable lenses differing in focal length and provided with range finders coupled to the focusing adjustment of such lenses, so that the camera objective is always focused on objects spaced at the distance for which the range finger is set.

In cameras adapted to employ interchangeable lenses differing in focal length it is difficult to provide a range finder which will be properly coupled to each of the several lenses, so that the setting of the range finder will always correspond exactly with the focusing adjustment of each of the individual lenses. Heretofore, the proper adjustment of the range finder has been accomplished by a cam member corresponding to the focal length of the lens adapted to engage a lever connected to the movable optical member of the range finder to adjust the same when the lens is focused, and the cam member was a part of the lens mount, being integral therewith or attached thereto in any suitable manner.

It is one object of the present invention to provide for such cameras a range finder coupling which is so constructed and arranged that the focusing adjustment of each of a number of lenses will always correspondingly adjust the setting of the range finder. Another object of the present invention is to provide a camera of the type described wherein the cam for adjusting the range finder is carried by the camera instead of by the lens mount. Still another object is to provide a cam for the purpose described which is variable as to pitch so as to be properly formed in accordance with the focal length of the lenses by the individual lens mounts as they are positioned on the camera. Yet another object is to provide a camera of the type described wherein the operating cam is connected to the focusing member for the lenses when the mount is placed on the camera to be properly moved in conjunction therewith. And a further object is to provide a structure of the type described wherewith the lenses can be focused either by the lens mount or from a focusing knob carried by the camera.

Briefly, my invention includes a camera having a range finder of the kind in which the focusing movement of the camera lens is transmitted to the movable member of the range finder by means of a lever operated by a variable cam member mounted in the camera and moved by the focusing member. The cam member is normally of zero pitch, but is adjusted to the proper pitch corresponding to the lens being used when engaged by protuberances on the mount for said lens, which protuberances correspond to the focal length of the lens contained in the mount. When each lens mount is positioned in the camera, engagement is automatically effected between the focusing mechanism and the variable cam member so that the latter is properly moved during the focusing of the lens.

Figure 3:
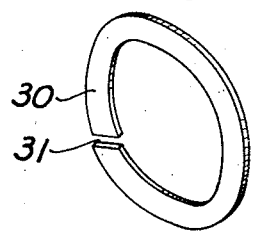
Figure 4:
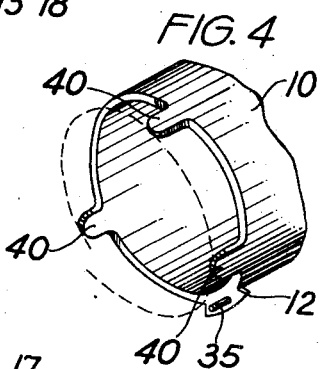
Figure 2:
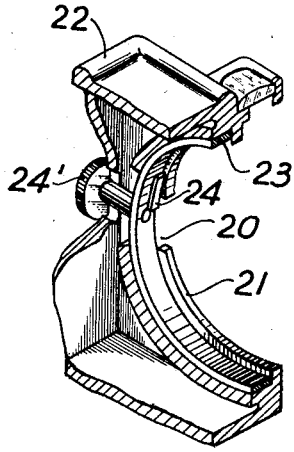
Figure 5:
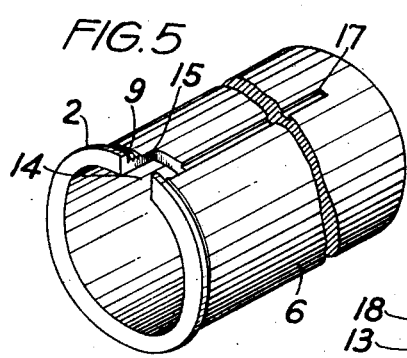
Figure 6:
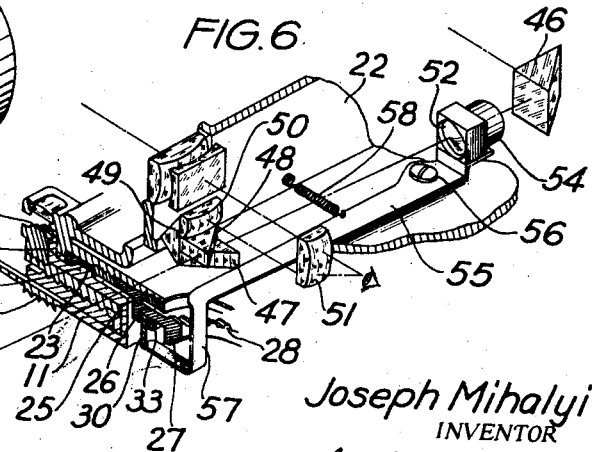

The novel features that I consider characteristic of my invention are set forth with particularity in the appended claims. The invention itself, however, both as to its organization and its method of operation, together with additional objects and advantages thereof, will best be understood from the following description of a preferred embodiment when read in conjunction with the accompanying drawing in which, Fig. 1 is a view partly in section, and showing a lens mount attached to a camera according to my invention, Fig. 2 is a perspective of the camera front, and showing the means for attaching the lens mount to the camera, Fig. 3 is a perspective of the variable cam mounted in a camera, Fig. 4 is a perspective of the rear end of the focusing sleeve of the lens mount and showing the protuberances corresponding to the focal length of the lens carried by the mount which are adapted to engage and form the variable cam member when the mount is positioned on the camera, Fig. 5 is a perspective of the lens barrel of the mount, and showing how the lens barrel is formed to permit the same to be telescoped within the camera for carrying purposes, and Fig. 6 is a partial view, in perspective, of a camera with a lens mount positioned thereon, and showing the connection between the focusing member and the movable member of one type of range finder.

Like reference characters refer to corresponding parts throughout the drawing.

It is pointed out that although I have shown and described one form of interchangeable lens mount in disclosing my invention, the invention is not limited to the particular form of the lens mount shown, but is applicable to any type of interchangeable lens mount wherein the lenses are adapted for focusing. Referring now to Fig. 1, wherein I have shown a preferred embodiment of the invention, 5 indicates an interchangeable lens mount generally which includes a lens barrel 6 in which are mounted optical elements 7 forming a camera lens of given focal length. The lens barrel 6 is telescopically mounted in a ring 8 to move between an extended picture-taking position, as shown, and a collapsed position wherein it is slid axially of the ring and into the camera. The lens barrel 6 is held in its extended position when threads 9 on the rear end thereof engage the threads on the rear end of the ring 8, and the barrel is properly positioned axially of the ring when a flange 2 on the rear end thereof engages the rear end of said ring.

The lens barrel 6 is moved axially for focusing when a focusing sleeve 10, in threaded engagement with the ring 8, is rotated to drive ring 8. Rotation of the lens barrel 6 and ring 8 is prevented by a key 11, integral with a stationary member 13 of the mount, which extends into a keyway 14 in the end of the lens barrel; and the rear end of focusing sleeve 10 is provided with an arcuate radial flange 12 which engages the rear end of the stationary member 13 of the mount to rotatably confine the focusing sleeve 10 on the mount. This arcuate flange 12 in addition to serving to hold the focusing sleeve for axial movement on the mount, also is adapted to engage a stop, not shown, on the stationary member 13 to limit rotation of the focusing ring to less than 360 degrees. When the lens barrel is locked in its extended position the key 11 engages wall 15 of the keyway 14 to prevent rotation of the mount, see Fig. 5. This keyway is made wide enough to permit sufficient relative rotation between the lens barrel 6 and the ring 8 to disengage the threaded engagement between the two, and the threads are made steep so that the necessary relative rotation to disengage the barrel and ring will be slight. When the lens barrel 6 has been rotated to disconnect it from the ring 8, the key 11 will engage the other wall of the keyway and will be aligned with a slot 17 extending longitudinally of the barrel so that said barrel may be telescoped into the camera relative to the ring and key 11. For the purpose of assembling, the knurled flange 18 is shown in screw threaded engagement with the focusing sleeve 10, but it will be readily understood that this flange and ring are moved together for focusing and can be considered as a single part.

For removably attaching the lens mount to the camera the stationary ring 13 of the mount is provided with a plurality of projections 19 placed around the periphery thereof and extending radially therefrom, and which are adapted to slip through a corresponding number of recesses 20 spaced around the periphery of the lens mount socket 21 in the front wall of the camera 22 when the lens mount is seated in said socket. The lens mount is locked on the camera when the locking ring 23 is rotated by moving the finger piece 24', attached thereto and extending through one wall of the camera, to its locking position wherein lugs 24 positioned on the inner surface of the ring 23 come between the projections 19 on the lens mount and the recesses 20 in the camera wall.

Rotatably mounted in the camera 22 is a focusing ring 25 recessed to form front and rear flanges 26 and 27 respectively, and provided around its exterior with gear teeth 28 which engage a focusing pinion 29 driven by a focusing knob, not shown, which may be mounted on the camera in any convenient position. A variable facial cam member 30, see Fig. 3, is mounted in the recess of the focusing ring 25 in such a way as to be capable of axial movement relative to said ring, but fixed to rotate therewith. As shown, this variable cam member may comprise a split spring ring normally having a zero pitch, and having an arcuate portion 31 cut away to engage a radial projection 32 in the recess of the focusing ring by virtue of which engagement the spring ring is mounted in the focusing ring so as to be capable of axial movement relative thereto but fixed to rotate therewith. The variable cam member 30 is normally forced toward the front flange 26 of the focusing ring 25 and into a contour of zero pitch by a spring ring 33 mounted in the recess of the focusing ring between the variable cam member and the rear flange 27 on said ring.

When the lens mount 5 is seated in the socket 21, a pin 35 fixed to and extending rearwardly of the arcuate radial flange 12 on the rear of the focusing sleeve 10, see Figs. 1 and 4, projects between and engages teeth 36 formed in the edge of the front flange 26 to connect the focusing sleeve to the focusing ring 25 so that rotation of one will cause rotation of the other. The teeth 36 extend completely around the flange 26 of the focusing ring so that the pin 35 will engage the teeth no matter in what position the focusing ring 25 is in when the mount is placed on the camera. The rear end of the focusing sleeve 10 is provided with protuberances 40, see Fig. 4, the lengths of which are such that a helix formed by connecting the ends thereof, indicated by the dotted line in Fig. 4, will have a pitch corresponding to the focal length of the lens contained in the mount. When the lens mount 5 is positioned on the camera, these protuberances engage the variable cam member 30 and thrust it rearwardly against the spring 33 to form a cam having a pitch corresponding to the focal length of the lens contained in the mount.

The movable member of the range finder is connected to the variable cam so that the pitch of the variable cam serves to effect the proper adjustment of the range finder in accordance with the focal length of the lens contained in the mount. For the purpose of illustrating the manner in which the cam 30 adjusts a movable member of a range finder, I have shown it in connection with a well-known type of telescopic range finder, see Fig. 6. This range finder includes two end prisms 45 and 46 which collect the range finder beams and direct them along the base line to a beam combining and erecting system, comprising prisms 47, 48, and 49, which direct the combined beams rearwardly through the lenses 50 and 51 to the eye of the observer. The lenses 50 and 51 form an ocular for the two telescopes having objectives 52 and 53 which are positioned, respectively, in two range finder beams prior to their being combined by the prisms 47 and 48. As is well known, one of the end prisms 45 and 46, or one of the objectives, such as objective 52, is made movable for bringing the range finder into coincidence. The movable objective 52 is carried by a mount 54 secured to one end of a lever 55 which is pivotally mounted to the camera 22 by means of screw 56. The other end 57 of the lever 55 is bent so as to extend into the rear of the focusing ring 25 to engage the rear face of the variable cam member 30. The lever 55 is held in engagement with the cam member by suitable resilient means such as a tension spring 58.

In this arrangement, after a lens mount has been positioned on the camera to form the cam member 30 in accordance with the focal length of the lens contained therein, focusing ring 25 is rotated when the lens is focused and this rotation is imparted to the cam member 30 carried thereby. As the cam member 30 is rotated, the lever 55 is moved according to the pitch of the cam, and this movement of the lever adjusts the movable objective 52 in strict accordance with the focal length of the lens contained in the mount. It will be appreciated that the focusing sleeve of each mount is provided with protuberances corresponding to the focal length of the lens contained therein so that when a mount containing a lens of one focal length is removed from the camera and another mount containing a lens of a different focal length is positioned in the camera, the cam member 30 will be reshaped or reformed to a pitch corresponding to the focal length of the lens contained in the latter mount.

It will be understood that although I have shown my invention in connection with one particular range finder, the same is not limited to use therewith, but can be used in connection with any range finder which is adapted to be adjusted in accordance with the focal length of a lens during the focusing of said lens.

From the above description the operation of the present invention will be obvious. When a lens mount is positioned on the camera, protuberances 40 on the rear end of the focusing sleeve thereof, and corresponding to the focal length of the lens contained in the mount, will engage the variable facial cam member 30 to form it into a cam having a pitch appropriate to the focal length of the lens contained in the mount. Focusing can be done by turning the focusing sleeve 10 directly or turning it from a focusing knob on the camera. In the event focusing is done by turning the focusing sleeve 10, rotation of this sleeve causes rotation of the focusing ring 25 in the camera, whereupon the variable cam 30 is rotated therewith and the movable member of the range finder is adjusted according to the pitch of the cam and therefore in accordance with the focal length of the lens contained in the mount. If focusing is done from a focusing knob on the camera, the focusing ring 25 is rotated by the focusing pinion 29 which in turn rotates the focusing sleeve 10 to focus the lens, and rotates the cam member 30 to adjust the range finder in strict accordance with the lens contained in the mount.

Although I have shown and described a specific embodiment of my invention, I am fully aware that many modifications thereof are possible. My invention, therefore, is not to be restricted except in so far as is necessitated by the prior art and by the spirit of the appended claims.

Having thus described my invention, what I claim as new and desire to secure by Letters Patent of the United States is:

1. In a photographic camera adapted to use interchangeable lenses of different focal length which lenses are carried in focusing mounts, the combination with a range finder carried by the camera and including a movable optical element, means for removably attaching the lens mount to the camera, of a member mounted in the camera to be moved by the lens mount in focusing and adapted to move the movable optical element of the range finder, said member capable of being deformed without retaining a permanent set and adapted to be deformed by a deforming means on said mount, and formed in accordance with the focal length of the lens carried by said mount, when said mount is positioned on the camera for altering the amount of movement transmitted to the movable optical element for a given movement of the member, whereby the range finder will be adjusted by focusing the lens mount in strict accordance with the focal length of the lens carried by the mount.

2. In a photographic camera adapted to use interchangeable lenses of different focal length which lenses are carried in focusing mounts, the combination with a range finder carried by the camera and including a movable optical element, means for removably attaching the lens mounts to the camera, of a member rotatably mounted in the camera to be moved by the lens mount in focusing and adapted to move the movable optical element of the range finder in accordance with the focusing movement of the mount, said member capable of being deformed without retaining a permanent set and adapted to be deformed by a deforming means on said mount, and formed in accordance with the focal length of the lens carried by said mount, when said mount is positioned on the camera for altering the amount of movement transmitted to the movable optical member for a given angular movement of the member, whereby the range finder will be adjusted by focusing the lens mount in strict accordance with the focal length of the lens carried by the mount.

3. A photographic camera having a coupling for adjusting a range finder in accordance with the movement of a focusing member, and provided with a socket adapted to receive a lens mount provided with protuberances corresponding to the focal length of the lens contained in the lens mount, said coupling including a member capable of being deformed without retaining a permanent set carried by the camera in a position to be engaged and deformed by said protuberances for altering said coupling means in accordance with the focal length of the lens, whereby the range finder will be adjusted by the focusing member in accordance with the focal length of the lens positioned in the socket.

4. In a photographic camera having a coupling for adjusting a movable optical element of a range finder in accordance with the movement of a focusing member, and provided with a socket adapted to receive a lens mount provided with protuberances corresponding to the focal length of the lens contained in the lens mount, a cam member capable of being deformed without retaining a permanent set movably mounted in said camera and arranged to be moved by said focusing member and in turn adjust the movable optical element of the range finder, said variable cam adapted to be engaged and deformed by said protuberances for altering the amount of adjustment transmitted to the optical element for a given movement of the cam member, whereby the range finder will be adjusted by the focusing member in accordance with the focal length of the lens positioned in the socket.

5. In a photographic camera provided with a lens socket, the combination of a range finder carried by the camera and including a movable optical element, a lens mount adapted to be positioned in the lens socket, a focusing member for focusing the lens contained in said mount, a coupling for adjusting the movable optical element of the range finder in accordance with the movement of the focusing member, and including a member capable of being deformed without retaining a permanent set movably mounted in the camera and arranged to adjust the movable optical element in accordance with the movement of the focusing member, and protuberances on the lens mount corresponding to the focal length of the lens contained in the mount and adapted to engage and deform said member for altering the amount of adjustment transmitted to the optical element by a given movement of said member, whereby the range finder will be adjusted by the focusing member in accordance with the focal length of the lens positioned in the lens socket.

6. In a photographic camera adapted to use interchangeable lenses of different focal length which lenses are carried in focusing mounts, the combination of a range finder carried by the camera and including a movable optical element, means for removably attaching the lens mounts to the camera, a facial cam capable of being deformed without retaining a permanent set rotatably mounted in the camera and adapted to move the movable optical element of the range finder upon rotation, said facial cam adapted to be engaged by means on each lens mount to be deformed to a contour corresponding to the focal length of the lens carried by the mount, and means for connecting said facial cam and focusing mechanism of the lens mount when the mount is attached to the camera, whereby the range finder will be adjusted in strict accordance with the focal length of the lens carried by the mount.

7. In a photographic camera provided with a lens socket, the combination of a range finder carried by the camera and including a movable optical element, a lens mount adapted to be positioned in the lens socket, a focusing member for focusing the lens contained in said mount, a coupling for adjusting the movable optical element of the range finder in accordance with the movement of the focusing member, and including a focusing ring rotatably mounted in the camera, means for connecting said focusing ring to said focusing member when the lens mount is positioned on the camera to be moved thereby, a facial cam capable of being deformed without retaining a permanent set mounted in said focusing ring to rotate therewith and move axially relative thereto, and arranged to adjust the movable optical element of the range finder when rotated, and protuberances on the mount corresponding to the focal length of the lens contained in the mount, and arranged to engage and deform said facial cam for altering the amount of adjustment transmitted to the optical member by a given movement of the cam, whereby the range finder will be adjusted by movement of the focusing member in accordance with the focal length of the lens positioned in the socket.

8. In a photographic camera provided with a lens socket, the combination of a range finder carried by the camera and including a movable optical element, a focusing ring rotatably mounted in the camera adjacent to and behind the lens socket, a facial cam capable of being deformed without retaining a permanent set fixed in said ring so as to be movable axially thereof but confined to rotation therewith, connecting means between the movable optical member and the face of the cam whereby the contour of the cam controls the movement of said optical member, a focusing lens mount adapted to be positioned in said socket, a plurality of cam forming means projecting from the rear end of said mount, and adapted to engage and shape the facial cam to a contour corresponding to the focal length of the lens carried by the mount when the mount is positioned on the camera, and means for connecting the focusing ring in the camera to the focusing mechanism of the mount when the latter is positioned on the camera, whereby movement of the focusing mechanism of the mount serves to rotate the focusing ring and the facial cam to move the movable optical member in strict accordance with the focal length of the lens positioned on the camera.

9. In a photographic camera provided with a lens socket, the combination of a range finder carried by the camera and including a movable optical element, a focusing lens mount adapted to be positioned in said socket, a rotatable focusing sleeve on said mount, a focusing ring rotatably mounted in the camera, means for connecting said focusing ring and said focusing sleeve when the mount is placed on the camera, a facial cam capable of being deformed without retaining a permanent set mounted in the focusing ring to rotate therewith but capable of movement axially relative thereto, a cam follower connected to the movable optical element and engaging the surface of the facial cam whereby the optical element is adjusted according to the surface of the cam, and cam forming means extending from the rear of said focusing sleeve and adapted to form a cam corresponding to the focal length of the objective carried by the mount, said cam forming means when said mount is positioned in said socket adapted to engage and shape the facial cam to a contour which will move the movable optical member of the range finder in strict accordance with the movement of the focusing ring of the mount.

10. In a photographic camera provided with a lens socket, the combination of a range finder carried by said camera and including a movable optical element, a focusing lens mount adapted to be positioned in said socket, a rotatable focusing sleeve on said mount, a focusing ring rotatably mounted in the camera adjacent and behind the lens socket therein, a facial cam variable as to pitch without retaining a permanent set mounted in said ring to rotate therewith, but capable of axial movement relative thereto, resilient means tending to force said facial cam toward the lens socket and to a zero pitch, means for connecting the movable optical element to the adjustable cam whereby it is adjusted according to the pitch of the cam, a plurality of protuberances extending from the rear of the mount, and adapted to engage and alter the pitch of the facial cam according to the focal length of the lenses carried by the mount when said mount is positioned in said socket, and means for positively connecting the focusing sleeve of the mount to the focusing ring in the camera when the mount is attached thereto, whereby the range finder will be adjusted in strict accordance with the focal length of the lens positioned on the camera.

JOSEPH MIHALYI.